Dec. 10, 1957 B. BRIGHTMAN 2,816,249
CYCLIC ALLOTTING CIRCUITS
Filed Feb. 20, 1956
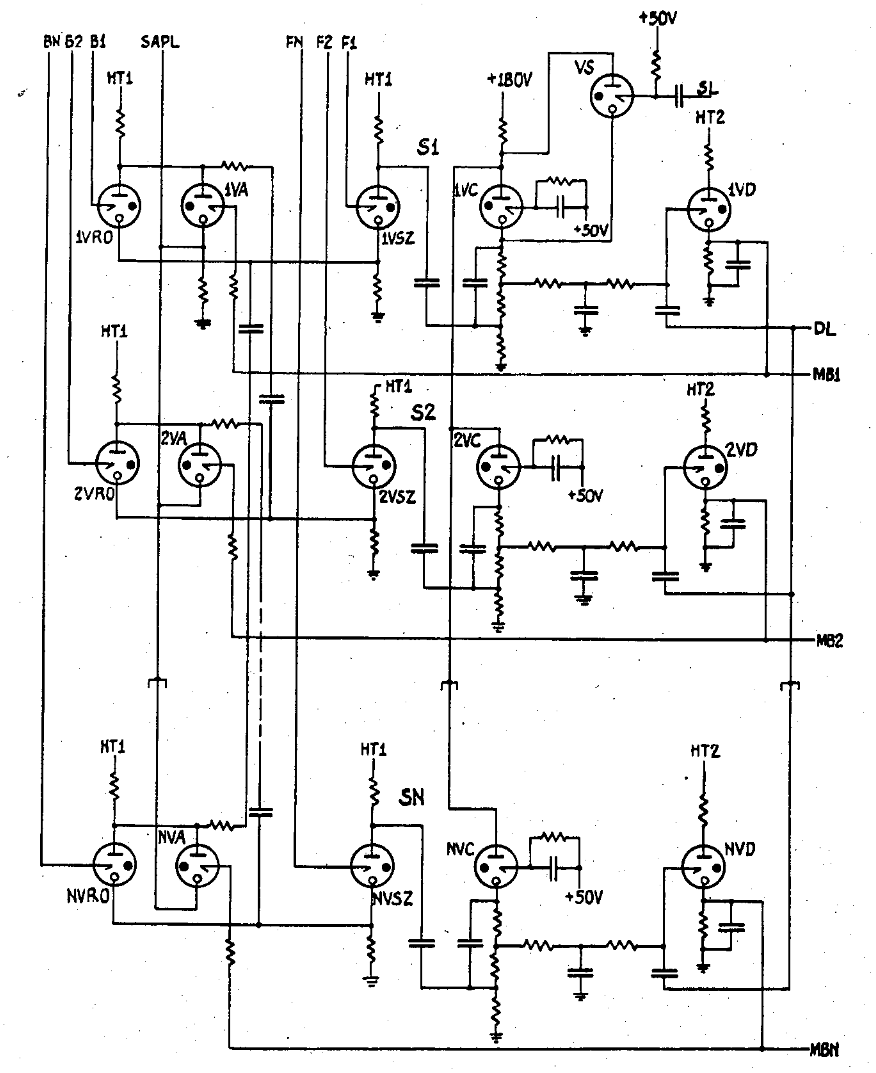
*Inventor*
BARRIE BRIGHTMAN
By Young, Emery & Thompson
*Attorneys*

United States Patent Office 2,816,249

Patented Dec. 10, 1957

2,816,249

CYCLIC ALLOTTING CIRCUITS

Barrie Brightman, Liverpool, England, assignor to Automatic Telephone & Electric Company Limited, Liverpool, England Application February 20, 1956, Serial No. 566,642

Claims priority, application Great Britain March 11, 1955

4 Claims. (Cl. 315—84.5)

The present invention relates to cyclic allotting circuits of the type employing gas-filled cold-cathode tubes.

The invention has application to automatic telephone systems and the like where, for instance, common equipments, such as registers, are required to be pre-allotted for use in cyclic order taking into account those equipments which are already in use.

The object of the invention is to provide a high-speed and reliable cyclic allotter which is completely static insofar as no mechanisms such as relays or uniselectors are employed.

According to the invention, one of a plurality of cold-cathode gas discharge tubes provided on the basis of one for each of the equipments is marked when the corresponding equipment is preallotted for use and is arranged to strike in response to a signal applied to all said tubes, the striking of said one tube serving to take the corresponding equipment into use and to initiate the stage-by-stage operation of a closed hunting circuit having one stage for each of the equipments, the operation of the hunting circuit being arrested at a stage corresponding to the next available equipment to cause the marking of another of said plurality of tubes corresponding to the next available equipment thereby preallotting the last-mentioned equipment for use.

The invention will be better understood from the following description of the preferred method of carrying it into effect which should be read in conjunction with the accompanying drawing.

The allotter shown in the drawing comprises a plurality of stages of which the first, second and last, designated S1, S2 and SN respectively, are shown. Each stage is related to a separate equipment for instance a register in an automatic telephone exchange.

Three groups of leads, namely B1, B2 . . . BN, F1, F2 . . . FN and MB1, MB2 . . . MBN extend from the equipments subject to the allotting function, correspondingly numbered leads in each group emanating from the same equipment. It is arranged that busy equipments apply positive potentials to the first group of leads, whereas the remaining equipments which are idle, connect positive potentials to the appropriate ones of leads F1 to FN. The said groups of leads are the bias leads for tubes 1VRO, 2VRO . . . NVRO and 1VSZ, 2VSZ . . . NVSZ respectively, and the pairs of tubes 1VRO and 1VSZ and so on are incorporated in stages of a high-speed hunting circuit which comprises a closed chain, the tubes of each pair having come to be known as the "run-on" and "seize" tubes respectively. Leads MB1, MB2 . . . MBN are arranged to be biased separately to effect seizure of the relevant equipments.

The tubes 1VC, 2VC . . . NVC of the various stages of the allotter, having a common anode resistor and individual cathode loads each comprising a resistor and capacitor in parallel, are arranged to be mutually extinguishing and any one of them may be conducting at any time. The tube which happens to be conducting determines that the equipment relevant to its stage is pre-allotted for use when the allotter next receives a demand.

Assuming that tube 1VC is found in the conducting condition, a positive potential derived from its cathode load, is applied to the trigger electrode of tube 1VD in the same stage to prime the latter tube. When an equipment is required for use, a positive-going pulse is received by the allotter over lead DL and is extended over individual capacitors to the trigger electrodes of tubes 1VD, 2VD . . . NVD, but only tube 1VD is fired since it alone has been primed. Upon tube 1VD conducting, a positive potential derived from its cathode is connected to lead MB1 to seize the equipment served by stage S1. The positive potential is also applied over a resistor to the trigger electrode of tube 1VA also in the first stage of the allotter, and therefore this tube 1VA is primed.

After a short interval a negative-going pulse is received over lead SAPL for the purpose of advancing the allotter. The pulse is applied to the common cathode resistor of tubes 1VA, 2VA . . . NVA, and as a result that tube which was primed, viz. tube 1VA, is rendered conducting. Thereupon the reduction in anode potential of the latter causes a negative-going pulse to be applied to the cathodes of tubes 2VRO and 2VSZ in the next stage to enable one or other of these tubes to respond in accordance with the idle or busy state of the equipment served by that stage. Now if the particular equipment is busy, tube 2VRO is already primed by a potential present upon lead B2 whereas the absence of a potential from the corresponding lead F2 ensures that tube 2VSZ is not primed, and accordingly the negative-going pulse derived from tube 1VA brings about conduction of tube 2VRO which therefore passes a negative-going pulse to the trigger electrodes of the run-on and seize tubes of the next stage. This hunting operation proceeds from stage-to-stage until an idle equipment is encountered, whereupon the relevant seize tube is fired. Thus for example, if the equipment relevant to the last stage SN is the first to be encountered idle, tube NVSZ in that stage is fired. Tube NVRO remains non-conducting so that the hunting operation is terminated.

Upon tube NVSZ being fired, the reduction in its anode potential causes a negative pulse to be applied to the cathode of tube NVC which therefore conducts and in so doing extinguishes the previously conducting tube 1VC by the mutual extinguishing action. The latter tube removes the positive bias from tube 1VD, whereas the newly fired tube NVC primes tube NVD. The condition of tube NVD now ensures that the next demand for an equipment, evidenced by the reception of a pulse over conductor DL, is effective in firing tube NVD which would cause the relevant equipment to be seized over lead MBN. Also tube NVA is caused to conduct by tube NVD, and thereupon tubes 1VRO and 1VSZ of stage S1 are primed to ensure that hunting will be started at that stage.

Tubes 1VC, 2VC . . . NVC obtain their H. T. supply from a permanent 180 v. source, and it will be also noted that the first of said tubes has another tube, VS, connected in parallel. This permanently primed tube is included for initially activating the series of tubes 1VD to NVD of the allotter, after the +180 volts supply has been connected to those tubes. Tube VS is arranged to be fired by a positive pulse received by its trigger electrode over lead SL, and its function substitutes that of tube 1VC in that it primes tube 1VD to prepare for the seizure of the first equipment. Tube VS is extinguished by the firing of any of tubes 2VC to NVC and subsequently remains inoperative.

Tubes 1VRO, 1VSZ and 1VA and the corresponding tubes in each stage derive their HT supply from a common source HT1, whereas tubes 1VD, 2VD . . . NVD obtain HT from a source HT2. Both of these sources would be arranged to be momentarily disconnected upon the completion of each pre-allotting operation to ensure the extinguishing of any of the relevant tubes. The allotter may be disabled, without interfering with tubes 1VC to NVC, by disconnecting the high tension sources HT1 and HT2, and such disconnection would be effected (by means not shown) when all equipments served by the allotter are in the busy condition.

I claim:

1. Circuit arrangements for cyclically allotting a plurality of equipments for use comprising a first plurality of cold-cathode gas discharge tubes one for each of said equipments, a hunting circuit having a plurality of stages one for each of said equipments and connected in a closed chain, means for applying a priming potential to the one of said gas discharge tubes which corresponds to an allotted equipment, means responsive when an allotted equipment is required for use for applying a striking potential to all said gas discharge tubes whereby the primed one of said gas discharge tubes conducts, means responsive to the conduction of said one gas discharge tube for taking said equipment into use and for operating said hunting circuit to find the next available equipment and means responsive to said hunting circuit escountering an available equipment for terminating the hunting operation and for applying a priming potential to the one of said gas discharge tubes corresponding to the newly allotted equipment.

2. Circuit arrangements as claimed in claim 1 and comprising in addition a second plurality of cold-cathode gas discharge tubes one for each of said first plurality of gas discharge tubes and each connected to one stage of said hunting circuit, means responsive to the termination of the hunting operation for striking one of said second plurality of gas discharge tubes and means responsive to the striking of said one tube of said second plurality of gas discharge tubes for extinguishing any other conducting one of said second plurality of gas discharge tubes and for applying a priming voltage to the corresponding one of said first plurality of gas discharge tubes.

3. Circuit arrangements as claimed in claim 2 wherein each stage of said hunting circuit includes a first and second cold-cathode gas discharge tube, means for priming said first tube of the stage if the corresponding equipment is available, means for priming said second tube of the stage if the corresponding equipment is unavailable, means responsive to the application of a striking potential to both said tubes when said first tube of the stage is primed for causing said first tube to strike, means responsive to the striking of said first tube of the stage for applying a striking potential to the one of said second plurality of gas discharge tubes connected to the stage, means responsive to the application of a striking potential to both said tubes when the second tube of the stage is primed for causing said second tube to strike and means responsive to the striking of said second tube of the stage for applying a striking potential to both tubes of the next stage of the hunting circuit.

4. Circuit arrangements as claimed in claim 3 wherein each stage of said hunting circuit includes a third cold-cathode gas discharge tube, means responsive to the taking into use of the equipment corresponding to one stage of the hunting circuit for applying a priming potential to the third gas discharge tube of said one stage and means responsive to the application of a striking potential to all the third gas discharge tubes for causing the third gas discharge tube of said one stage to conduct and apply a striking potential to the first and second gas discharge tubes of the next stage.

References Cited in the file of this patent

UNITED STATES PATENTS

| | | |
|---|---|---|
| 2,489,325 | Ridler | Nov. 29, 1949 |
| 2,594,389 | Bruce | Apr. 29, 1952 |
| 2,629,020 | Robertson | Feb. 17, 1953 |
| 2,668,931 | Hall et al. | Feb. 9, 1954 |